(12) United States Patent
Shubina et al.

(10) Patent No.: US 9,043,699 B1
(45) Date of Patent: May 26, 2015

(54) DETERMINING EXPANSION DIRECTIONS FOR EXPANDABLE CONTENT ITEM ENVIRONMENTS

(75) Inventors: Ksenia Shubina, Vaughn (CA); Pavel Kobyakov, Waterloo (CA)

(73) Assignee: Google Inc., Mountain View, CA (US)

( * ) Notice: Subject to any disclaimer, the term of this patent is extended or adjusted under 35 U.S.C. 154(b) by 379 days.

(21) Appl. No.: 13/541,868

(22) Filed: Jul. 5, 2012

(51) Int. Cl.
*G06F 17/00* (2006.01)
*G06F 17/24* (2006.01)
*G06F 17/21* (2006.01)

(52) U.S. Cl.
CPC ............ *G06F 17/247* (2013.01); *G06F 17/211* (2013.01)

(58) Field of Classification Search
CPC .............. G06F 17/247; G06F 17/2247; G06F 17/2294; G06F 17/30896; G06F 17/211
USPC .......... 715/234, 243, 244, 245, 246, 247, 255
See application file for complete search history.

(56) References Cited

U.S. PATENT DOCUMENTS

| | | | |
|---|---|---|---|
| 6,115,690 A * | 9/2000 | Wong | 705/7.27 |
| 6,615,251 B1 | 9/2003 | Klug | |
| 6,725,287 B1 * | 4/2004 | Loeb et al. | 710/8 |
| 6,973,436 B1 | 12/2005 | Shkedi | |
| 7,610,560 B2 * | 10/2009 | Horvitz et al. | 715/764 |
| 7,746,343 B1 * | 6/2010 | Charaniya et al. | 345/428 |
| 7,853,492 B1 * | 12/2010 | Kirklin et al. | 705/28 |
| 7,979,382 B2 * | 7/2011 | Guyan et al. | 1/1 |
| 8,237,937 B2 | 8/2012 | Sugiyama | |
| 8,350,849 B1 * | 1/2013 | Jones et al. | 345/419 |
| 8,352,539 B2 * | 1/2013 | Mizuno | 709/201 |
| 8,462,949 B2 * | 6/2013 | Anderson et al. | 380/252 |
| 8,510,167 B2 | 8/2013 | Lisbakken | |
| 8,578,057 B2 | 11/2013 | Omar | |
| 8,606,723 B2 | 12/2013 | Seubert et al. | |
| 8,694,632 B1 | 4/2014 | Shubina et al. | |
| 8,751,304 B1 | 6/2014 | Kobyakov et al. | |
| 2002/0042786 A1 | 4/2002 | Scarborough | |
| 2002/0046199 A1 | 4/2002 | Scarborough | |
| 2002/0152305 A1 | 10/2002 | Jackson | |
| 2002/0169803 A1 * | 11/2002 | Sampath et al. | 707/513 |
| 2003/0137512 A1 * | 7/2003 | Hoehn et al. | 345/428 |
| 2003/0182310 A1 * | 9/2003 | Charnock et al. | 707/104.1 |
| 2003/0182394 A1 * | 9/2003 | Ryngler et al. | 709/217 |
| 2004/0193388 A1 * | 9/2004 | Outhred et al. | 703/1 |
| 2004/0205711 A1 | 10/2004 | Ishimitsu et al. | |
| 2006/0074730 A1 | 4/2006 | Shukla et al. | |
| 2007/0150387 A1 * | 6/2007 | Seubert et al. | 705/31 |

(Continued)

FOREIGN PATENT DOCUMENTS

WO WO0019332 A9 10/2001

OTHER PUBLICATIONS

How do iframe busters for expandable ads work?; javascript—How do iframe busters for expandable ads work?—Stack Overflow; http://stackoverflow.com/questions/5553469/how-do-iframe-busters-for-expandable-ads-work; Aug. 15, 2012; 3 pages.

(Continued)

*Primary Examiner* — Laurie Ries
(74) *Attorney, Agent, or Firm* — Fish & Richardson P.C.

(57) ABSTRACT

This specification describes methods, systems, and apparatus, including computer programs encoded on a computer-readable storage device, for detecting expansion directions of content item environments that are used to display expandable content items.

20 Claims, 6 Drawing Sheets

(56) References Cited

U.S. PATENT DOCUMENTS

| | | | |
|---|---|---|---|
| 2007/0299857 A1 | 12/2007 | Gwozdz et al. | |
| 2008/0288342 A1 | 11/2008 | Ingleshwar | |
| 2009/0040246 A1* | 2/2009 | Miyasaka | 345/698 |
| 2009/0099901 A1 | 4/2009 | Sah et al. | |
| 2009/0187583 A1* | 7/2009 | Pape et al. | 707/100 |
| 2009/0299862 A1* | 12/2009 | Fan et al. | 705/14.73 |
| 2010/0082657 A1 | 4/2010 | Paparizos et al. | |
| 2010/0306249 A1* | 12/2010 | Hill et al. | 707/769 |
| 2010/0313129 A1* | 12/2010 | Hyman | 715/719 |
| 2011/0055685 A1 | 3/2011 | Jaquish et al. | |
| 2011/0071818 A1* | 3/2011 | Jiang | 704/8 |
| 2011/0153435 A1 | 6/2011 | Pisaris-Henderson | |
| 2011/0161990 A1 | 6/2011 | Smith et al. | |
| 2012/0101907 A1* | 4/2012 | Dodda | 705/14.73 |
| 2013/0238994 A1 | 9/2013 | Yurasits | |
| 2013/0275901 A1* | 10/2013 | Saas et al. | 715/769 |
| 2013/0339896 A1* | 12/2013 | Shadle et al. | 715/777 |
| 2014/0164923 A1* | 6/2014 | Georgiev et al. | 715/716 |
| 2014/0164985 A1* | 6/2014 | Pimmel et al. | 715/784 |
| 2014/0240293 A1* | 8/2014 | McCaughan et al. | 345/175 |

OTHER PUBLICATIONS

Introducing expandable ads on AdSense sites—Inside AdSense; Inside AdSense Blog; http://adsense.blogspot.com/2009/03/introducing-expandable-ads-on-adsense.html; Aug. 14, 2012; Mar. 4, 2009; 8 pages.

Macro overview; dfp DoubleClick for Publishers; http://support.google.com/dfp_premium/bin/answer.py?hl=en&answer=1242718; Aug. 14, 2012; 7 pages.

Expanding Options in Expandable Ads; Jun. 4, 2009; Wegert, Tessa; ClickZ/Marketing News & Expert Advise; http://www.clickz.com/clickz/column/1699404/expanding-options-expandable-ads; Aug. 15, 2012; 3 pages.

"Peters, 'Iframe loading techniques and performance', aaronpeters.nl, Dec. 20, 2010, on line at aaronpeters.nl/blog/iframeloading-techniques-performancer?%3E", 11 pages.

Gilbert, David, "Set IFrame height based on size of remotely loaded content", solidgone Blog, Mar. 13, 2010, XP055066250, Retrieved from the Internet: URL:http://solidgone.org/Set-IFRAME-height-based-on-size-of-remotely-loaded-content [retrieved on Jun. 11, 2013], abstract, 10 pages.

* cited by examiner

DETERMINING EXPANSION DIRECTIONS FOR EXPANDABLE CONTENT ITEM ENVIRONMENTS

BACKGROUND

This specification relates to serving expandable content items for presentation in content item environments.

Sponsored content (e.g. advertisements, deals or special offers) can be provided over the Internet to various user devices. For example, a web page can include slots in which sponsored content can be presented. These slots can be defined in the web page or defined for presentation with a web page, for example, along with search results or other content. Sponsored content can also be delivered through dedicated web portals or applications executing on the user devices.

Some content items are expandable. For example, a content item can be initially presented in an unexpanded form as a 728×90 pixel graphical item. When an expansion event occurs, an expanded view of 728×270 pixels can be presented. The expanded view of the content item should fit inside the web page as rendered on the browser to present unwanted effects such as clipping.

Expandable content items may expand uni-directionally or multi-directionally. A uni-directional expandable content item can only expand in one direction, such as "down", "up", "left", or "right." A multi-directional expandable content item, on the other hand, can expand in two or more directions.

Because the content items are served for particular content item environments in a web page, a client device typically requests the content items when the page is being rendered at the client device. The content item management system that receives the request attempts to select, in response to the request, content items that can expand in a direction for which there is available space for expansion on the web page. For example, a content item environment at the top of a web page should not receive an expandable content item that expands only in the "up" direction; rather, it should receive an expandable content item that expands in the "down" direction (or, alternative, in one or more of the "down", "right" and "left" directions, if there is space available for expansion in the "right" and "left" directions as well).

Content item serving systems use various models to determine the expansion directions available for a request. The models may be resource specific or site specific, or a combination of both. Resource specific models are based on observed expansions of an expandable content item environment for a particular resource, and site specific models are based on the observed expansions of an expandable content item environment for multiple resources of the site. While these models tend to provide adequate prediction coverage, there are requests for which the data that are available for predicting an expansion direction are insufficient. Consequently it may not be possible to determine the expansion direction of the particular content item environment.

SUMMARY

In general, one aspect of the subject matter described in this specification can be embodied in methods that include the actions of actions of receiving expandable content item requests for publishers, each request specifying a publisher, a content item environment position in a resource, and dimensions of the resource in which the content item environment is rendered; for each content item request, providing request data for a prediction specifying an expansion direction for the content item environment based on historical data of the publisher and the content item environment; for each prediction for which a successful prediction of a predicted expansion direction occurs, selecting an expandable content item having the same expansion direction as the predicted expansion direction; for each prediction for which a successful prediction does not occur: computing an expansion direction for the content item environment based on the location of the content item environment and dimension associated with the resource, and selecting an expandable content item having the same expansion direction as the computed expansion direction; and for each content item request, providing response data in response to the content item request that causes the selected expandable content item to be provided for the content item environment. Other embodiments of this aspect include corresponding systems, apparatus, and computer program products.

Particular embodiments of the subject matter described in this specification can be implemented so as to realize one or more of the following advantages. Content item providers and publishers can present expandable content items while minimizing undesirable display effects, such as clipping. Further, the process allows for determining expansion directions for slots that do not have sufficient data recorded. Therefore, in such cases a content item environment is more likely to be paired with an expandable content item that has an expansion direction suitable for the layout of the resource in which the content item environment is rendered.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Overview

This specification describes a process for determining expansion directions for expandable content item environments. A user device rendering a publisher page transmits a content item request to a content item management system. The request is generated as a web page that includes the content item environment for the content item that is being rendered. The request includes position data that describes the position of the content item environment in a browser environment, and also includes data regarding the size of the browser environment. In some implementations, the request also includes address data of the resource. The address data may be the resource URL, or may just be the domain or host of the resource. In some implementations, the content item management system queries an expansion prediction subsystem for expansion directions. The query includes the content item environment identifier (e.g., a slot number, for example), and the address data. The model is trained based on observed historical data. If the model returns predicted expansion directions, the content item management system uses the returned directions to filter expandable content items to identify expandable content items that are eligible for selection. If, however, the model does not return a predicted expansion direction, e.g., a null prediction value (or, alternatively, returns a predicted expansion direction with a confidence measure that does not meet a threshold), then the content item management system determines one or more expansion directions from the position data.

For example, the position data may specify the dimensions of the content item environment relative to the borders of environment in which the content item environment is rendered. The borders may be, for example, the borders of the web page itself or the borders of the viewport. Typically borders of the web page are used; however, viewport borders may be used if the viewport borders are of larger dimensions than the borders of the rendered web page, or when the border dimensions of the web page are not available. In either case, the content item management system utilizes the content item environment position relative to these borders to determine expansion directions for which there is available space for expansion of the content item environment on the web page. The content item management system then uses the returned directions to filter expandable content items to identify expandable content items that are eligible for selection.

Example Environment

Figure 1:
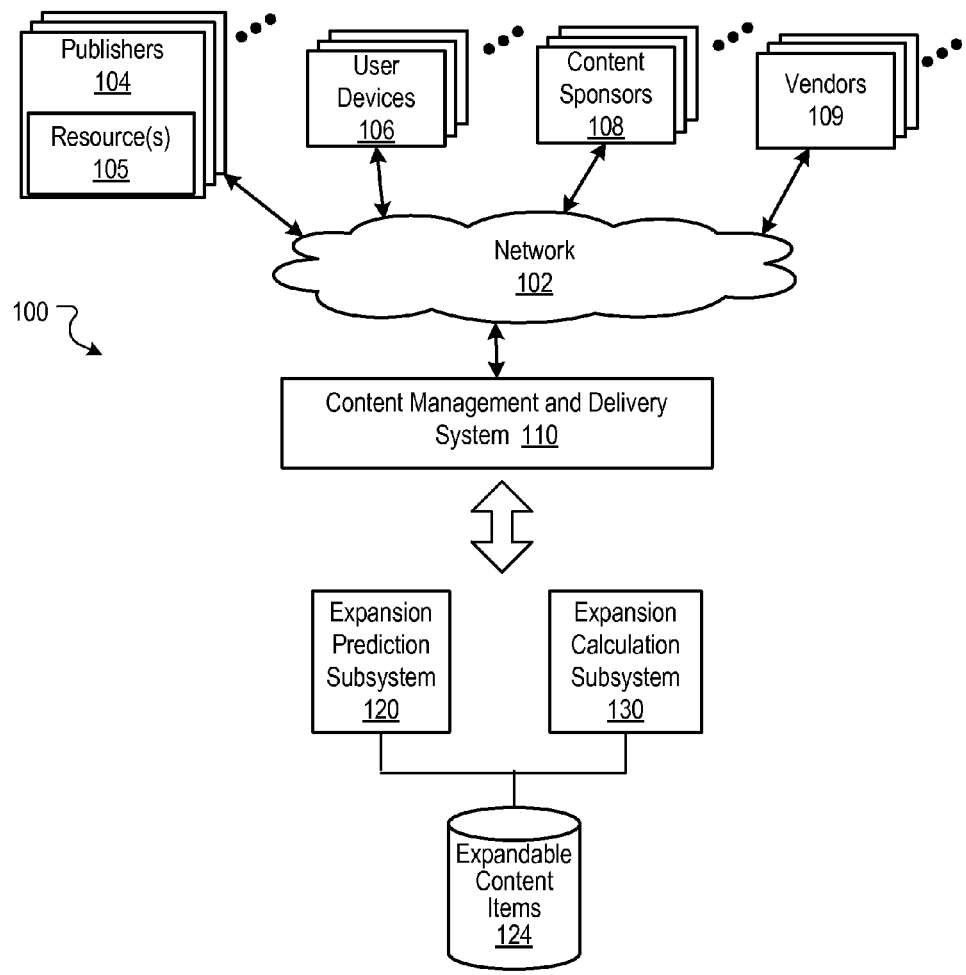
FIG. 1 is a block diagram of an example environment for delivering expandable content.

FIG. 1 is a block diagram of an example environment 100 for delivering content. The example environment 100 includes a content management and delivery system 110 for selecting and providing content to user devices. The example environment 100 includes a network 102, such as wide area network (WAN), the Internet, or a combination thereof. The network 102 connects publisher 104, user devices 106, content sponsors 108 (e.g., advertisers that use vendors to serve advertisements), vendors 109, and the content management and delivery system 110. The example environment 100 may include many thousands of publishers 104, user devices 106, content sponsors 108.

In some implementations, the content management and delivery system 110 includes a request handler that can receive a request for content from a user device, identify one or more content items (which may include one or more expandable content items 124), and provide a content item responsive to the request.

A publisher 104 typically manages a website that includes one or more resources 105 associated with a domain name and hosted by one or more servers. An example website is a collection of web pages formatted in hypertext markup language (HTML) that can contain text, images, multimedia content, and programming elements, such as scripts. Each publisher 104 is an entity that controls, manages and/or owns the website.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as scripts). In some implementations, the resources 105 can include sponsored content provided by the content sponsors 108 that can be rendered in specific locations in the resource. For example, the resources 105 can include an advertisement, a deal or a special offer sponsored by a content sponsor 108.

A user device 106 is an electronic device that is under control of a user and is capable of requesting and receiving resources over the network 102. Example user devices 106 include personal computers, televisions with one or more processors embedded therein or coupled thereto, set top boxes, mobile communication devices (e.g., smartphones), tablet computers, e-readers, laptop computers, personal digital assistants (PDA), and other devices that can send and receive data over the network 102. A user device 106 typically includes one or more user applications, such as a web browser, to facilitate the sending and receiving of data over the network 102.

A user device 106 can request resources 105 from a publisher 104. In turn, data representing the resource 105 can be provided to the user device 106 for presentation by the user device 106. The data representing the resource 105 can also include data specifying a portion of the resource or a portion of a user display, such as a presentation location of a slot of a third-party content site or web page, in which content can be presented. These specified portions of the resource or user display are referred to as content item environments (e.g., content item slots, or, in the case of advertisement content items, advertisement slots).

When a resource 105 is requested by a user device 106 and the resource includes a content item slot in which a content item of a sponsor is to be rendered, the content management system 110 receives a request for a content item. The request for the content item can include characteristics of the slots that are defined for the requested resource. Such characteristics may include position data that describes the location of the slots, and the dimensions of the resource in which the slots are rendered. Because the request is generated during the rendering process, the request may be sent before rendering is completed. The position data may be generated such that it reflects the relative position of a slot at the currently rendered state at the time the request is generated. As the rendering may be incomplete, the position data may be inaccurate.

The content management and delivery system 110 can select from the eligible content items that are to be provided to the user device 106 based at least in part, for example, on results of an auction. For expandable content items, the content management and delivery system 110 must first determine which expandable content items are eligible to participate in the auction. One eligibility factor is expansion direction. In particular, expandable content item that expand in particular directions should only be eligible for an auction if there is space available on the web page resource for the content item environment to expand in that particular direction. For example, a content item environment at the bottom of a resource should not be served an expandable content item that expands in the "down" direction. Selection of eligible content items is done by the expansion prediction subsystem 120 and the expansion calculation subsystem 130, and is describe in the sections that follow.

For situations in which the systems discussed here collect personal information about users, the users may be provided with an opportunity to opt in/out of programs or features that may collect personal information (e.g., information about a user's social network, social actions or activities, profession, a user's preferences, or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. In some implementations, users can opt out of being characterized or targeted for content, including advertisements, based on the interest profiles for which they may be characterized.

Figure 2A:
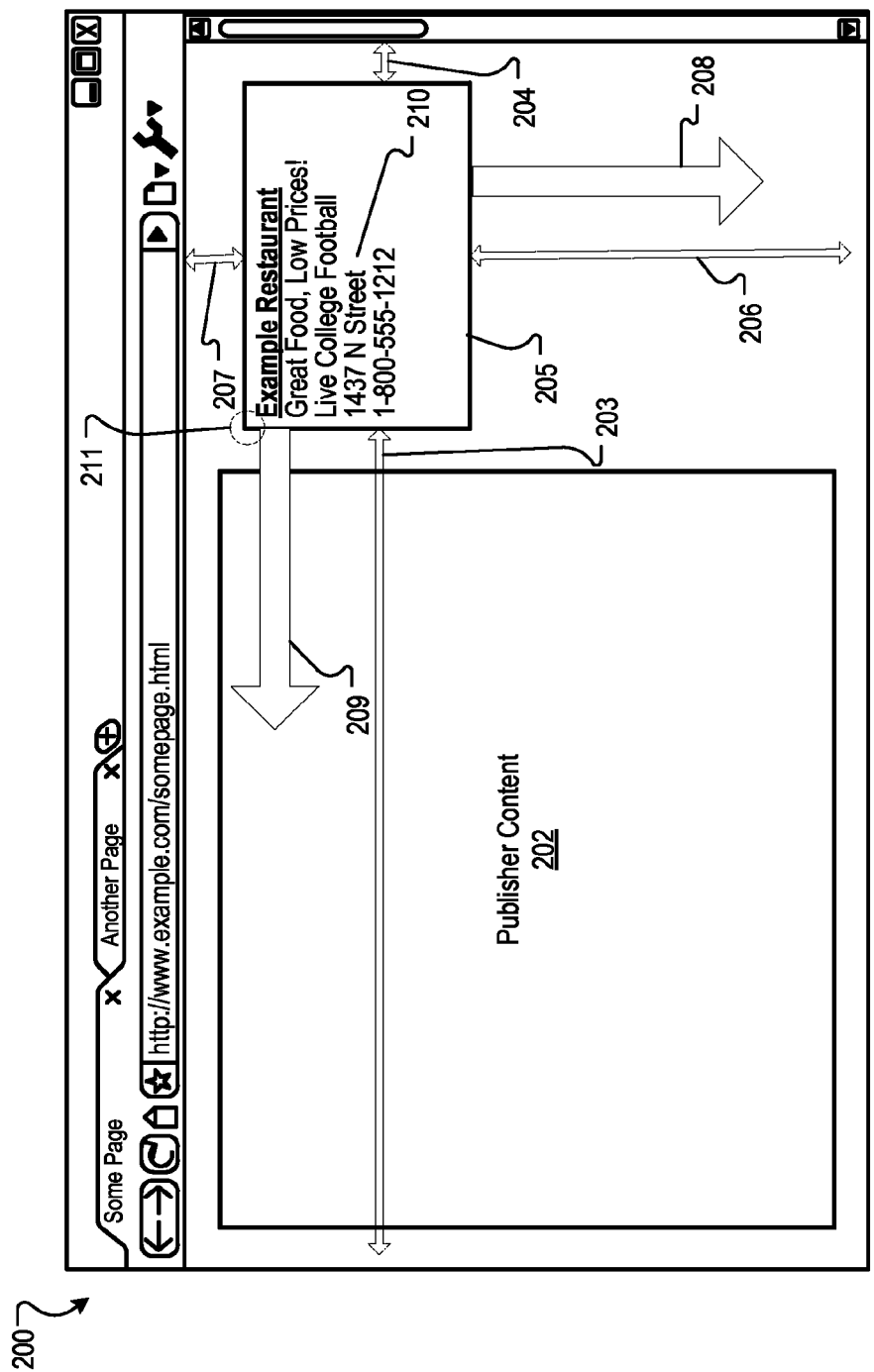
FIG. 2A depicts a browser displaying a sponsored expandable content item.

FIG. 2A shows an example user interface 200 in which content (such as sponsored content or requested content, or both) is provided to a user device 106. For example, the resource can include specific publisher content 202 that is authored by the publisher. Additionally, resource includes a content item slot 205 in which a content item from a third party can be rendered. The content management and delivery system 110 can provide the third-party content item (e.g., advertisements, etc.) from a pool of available content items.

In some implementations, the one or more content items 210 that are selected can be selected by conducting an auction. The content items that are eligible to participate in the auction can be selected by various targeting criteria, such as interest profiles, the relevance of content items to the publisher content 202, to a time of the day, geographical location, keywords, and expansion direction to name a few examples.

Figure 2B:
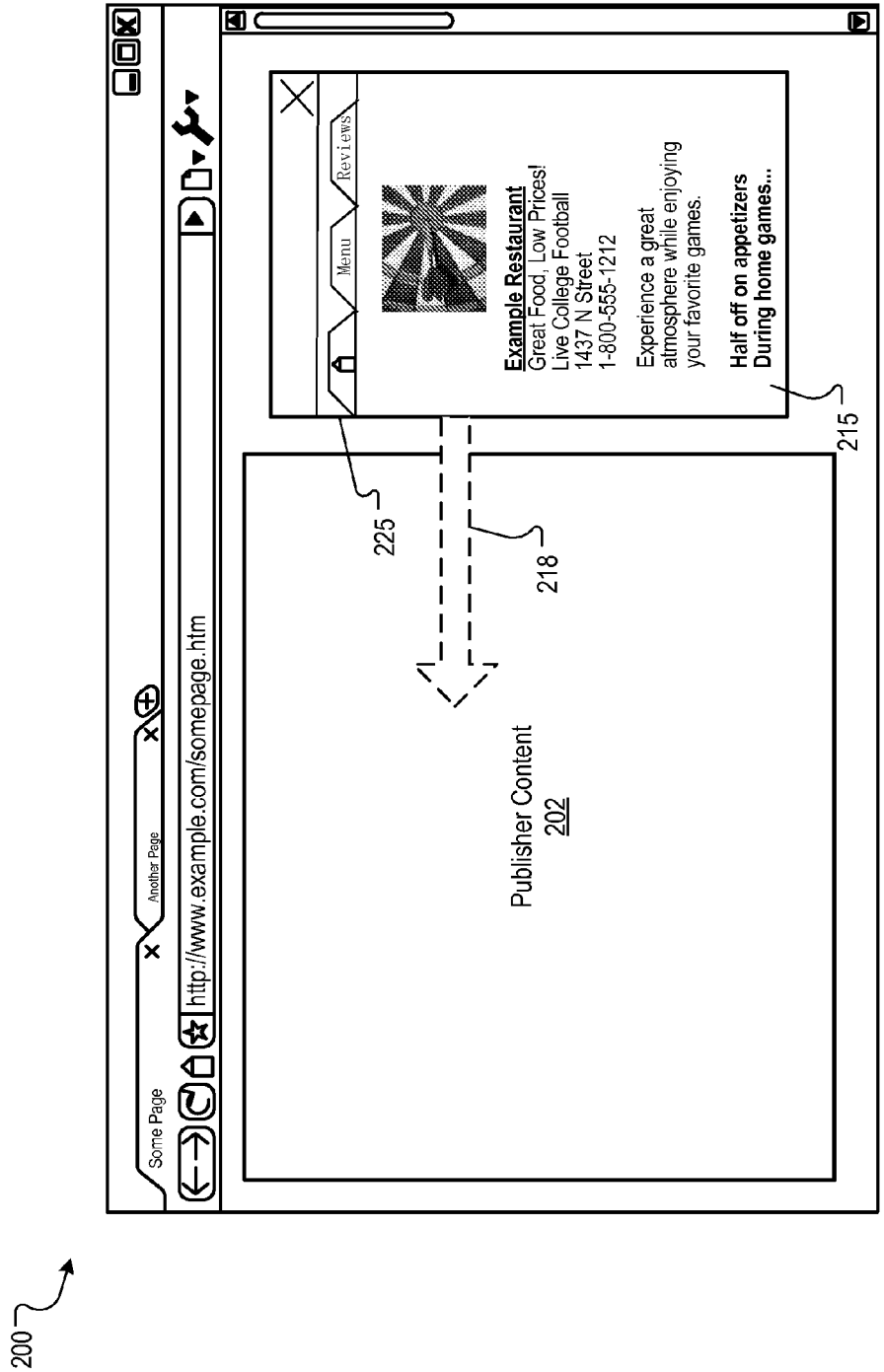
FIG. 2B depicts a browser displaying an expanded version of the sponsored expandable content item.

In the case of expandable content items, an unexpanded version of the content item is initially rendered in the content item slot 205. Depending on the expansion event for which the expandable content item is configured, the expandable content item may expand on the page load (or shortly after the page loads, such as after a timed delay), or in response to a user interaction, such as a mouse over or click. For example, an expanded version 215 of the content item 210 is shown in the example of FIG. 2B. In the example shown, the advertisement is expanded downward, however the advertisement may expand in other directions, such as the direction shown by phantom arrow 218.

The expanded version 215 displays additional information. The expanded version 215 can include additional content, for example, images, larger text, audio, video, or web-based content. In one example, the content item 210 is presented first as an advertisement in textual format while enabling the user to expand the advertisement into a menu-driven, graphical advertisement in the expanded version 215. The expanded content item 215 can also include a marker that the user can click or otherwise select such that the expanded content item 215 is replaced by the unexpanded content item 210.

Expansion Directions

With reference again to FIG. 2A, there are two possible expansion directions available for the content item slot 205, given the relative position of the slot 205 in the user interface 200. In particular, the slot 205 may expand in a "down" direction 208, or in a "left" direction 209. In some implementations, the content item request for a content item includes the position data as described above. Example position data may include the content item environment dimensions, the location of the content item environment in a viewport or page, and the dimensions of the viewport or page. Other appropriate position data may also be used.

In the example of FIG. 2A, assume that the slot has the following dimensions: a width of 128 units, and a height of 80 units. Assume also that the border values are the borders defined by the web page, which are defined by a width of 456 units, and a height of 240 units. Alternatively, the borders of the viewport, which in FIG. 2A encompass a slightly larger area than the borders of the web page, could instead be used.

Finally, assume that the slot position, as measured from a slot origin of the upper left corner of the slot, as indicted by the phantom circle 211, is at an offset of 312 units in the x-direction and 24 units in the y-direction. These values are included in the position data.

From this position data, the content management system 110, by use of an expansion calculation subsystem 130, determines eligible expansion directions. An eligible expansion direction is a direction for which there is enough display area to display an expansion of an expandable content item. The expansion direction is dependent on the distance separating a border of the content item environment and a border of the web page or view port. For example, in FIG. 2A, the distances 203, 204, 206 and 207 are, respectively, 312, i.e., ABS(312−0); 24 (ABS(0−24)); 136 (ABS(240−(24+80); and 64, ABS(456−(312+80)).

In some implementations, an eligible expansion direction for a particular direction is determined if the distance in the direction from the content item environment border to the parallel border of the web page (or viewport, if the viewport border is used) without an intervening content item environment border meets a threshold distance. For example, the threshold distance may be 100 display units. Thus, in FIG. 2A, the expansion directions of "down" and "left" are eligible expansion directions, as the respective distances between borders are 136 and 312. The directions of "right" and "up" are not eligible, as the respective distances are 24 and 64.

In variations of these implementations, the expansion calculation subsystem 130 determined that there are multiple expansion directions of different lengths in each direction. For example, if expandable content items are available for expansions of 80, 120 and 160 display units in the down direction, then the expansion calculation subsystem 130 would determine than "down" direction expansions are available for 80 and 120 display units, but "down" expansions are not available for 160 display units. Thus, content items that expand 160 display units in the down direction would not be eligible to fulfill the request for the slot 205.

In additional variations of these implementations, expansion directions are further subject to the requirement that an expansion will not occlude publisher content. For example, in FIG. 2A, the expansion direction 209 would not be selected, as expanding to the left would occlude the publisher content 202. To make this determination, a process generating the request determines the location of the publisher content 202 from the document object model of the resource, and includes this in the data provided to the content item management and delivery system 110. There, location data describing the area of display is generated (e.g., x- and y-coordinates of the display area for the content 202), and compared to estimated expansion dimensions of the expandable content item environment. For example, if the slot 205 were to expand 100 units to the left, the x-coordinate of the left most border of the slot would be at 212 display units (i.e., 312−100). As the x-coordinate of the right most border of the content display area for the content 202 is approximately 296, which is greater than 212, and the y-coordinates of the slot 205 are within the upper and lower y-coordinates of the area in which the content 202 is displayed, the process would determine that the expanded content item environment would occlude the display of the content 202. Accordingly, the "left" direction is not selected as an expansion direction.

In still other implementations, the expansion calculation subsystem selects the greatest of any direction as the expansion direction. For example, with reference to FIG. 2A, the "down" direction would be selected, as it has the largest distance of 324 display units.

In still other implementations, expansion directions are determined based only on the resource border measurements. For example, a content item environment may be positioned along the top of a 700 wide×2,000 vertical resource. The viewport, however, may be adjusted such that the only a 500 wide×400 vertical portion of the resource is displayed. Assume that an expansion in the "down" direction must be able to expand at least 500 display units. If the viewport size is used, then the "down" expansion direction will not be selected. However, if the resource size of 700 wide×2000 vertical is used, then the "down" expansion direction will be selected.

In still other implementations, the expansion directions are determined based on the larger of the resource border measurements and the viewport border measurements.

Expandable Content Item Selection

The content management and delivery system 110 is in communication with the expansion prediction subsystem 120 and the expansion calculation subsystem 130. The latter subsystems are used to provide expansion directions for a content item environment. For example, if a content item environment is determined to have expansion directions of "up" and "left" available, the expandable content items that expand in either the "up" direction, or in the "left" direction, or in both the "up" and "left" directions, will be eligible to fulfill the request. Expandable content items that expand in one or more of the "down" or "right" directions will not be eligible.

The expansion prediction subsystem 120 utilizes models (e.g., resource specific models and/or site specific models) to predict a direction of expansion for the content item environment and resource pair based on historical data. In response to receiving a content item request for a content item environment, the content management and delivery system 110 queries the expansion prediction subsystem 120. However, a predicted direction may not be returned for each query, or a prediction direction may be of such low confidence that it should not be used. This is because historical data may not available for every content item environment and resource pair, or that the data may not indicate a particular expansion direction with a desired confidence level. In either situation, the response from the expansion prediction subsystem 120 is considered to be an unsuccessful response.

Figure 3:
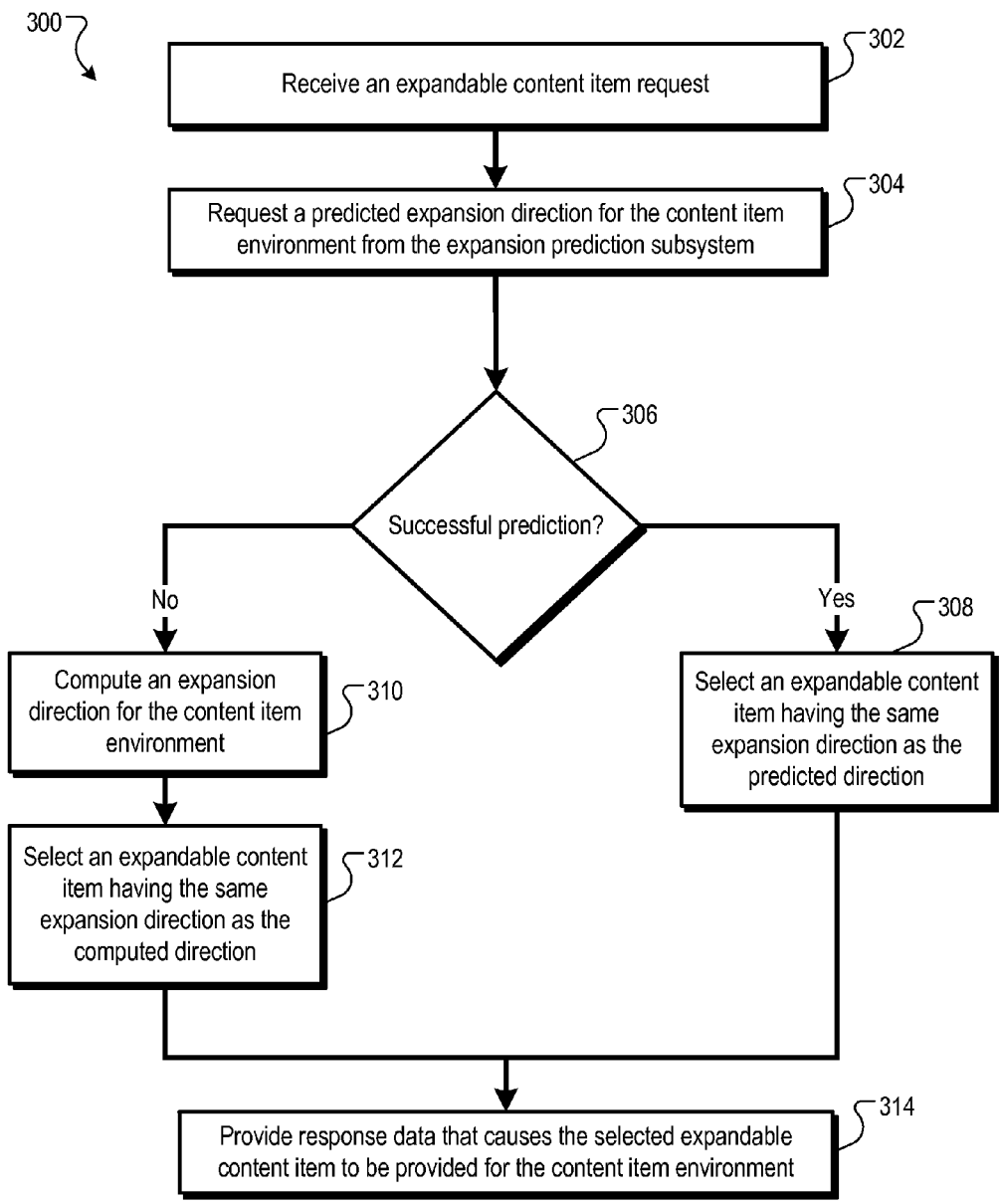
FIG. 3 is a flow diagram of an example process for selecting an expandable content item for placement in a content item environment.

Thus, to augment the expansion prediction subsystem 120, and expansion calculation subsystem 130 is used to calculate expansion directions for a request when the expansion prediction subsystem 120 does not successfully respond to the query. An example augmentation process is described with reference to FIG. 3, which is a flow diagram of an example process 300 for selecting an expandable content item for placement in a content item environment.

The process 300 receives a request for an expandable content item (302). The request is generated, for example, by a user device that is rendering a resource that includes an expandable content item environment. The request includes data specifying a publisher, a content item environment position in a resource, and dimensions of the resource in which the content item environment is rendered. The dimensions of the resource may be, for example, the active viewport dimensions, or, alternatively, may be the dimensions of the resource (which may differ from the dimensions of the viewport).

The process 300 requests a predicted expansion direction for the expandable content item environment from the expansion prediction subsystem (304). For example, the content management and delivery system 110 may provide request data to an expansion prediction subsystem 120 for a prediction specifying an expansion direction for the content item environment. The prediction may be based on historical data of the publisher and the content item environment.

The process 300 determines if a successful prediction is received in response to the request (306). For example, if the prediction subsystem 120 returns expansion directions, or returns expansion directions with a confidence measure that meets a threshold, then a successful prediction is received. Conversely, if no expansion directions are returned, or if the expansion directions that are returned do not have a confidence measure that meets the threshold, then a successful prediction does not occur.

If the process 300 determines a successful prediction is received, then the process 300 selects an expandable content item having the same expansion direction as the predicted direction (308). The successful prediction will provide one or more expansion directions. The content item management and delivery system 110 will select those expansion directions and use them to filter content items for delivery in response to the request.

Figure 4:
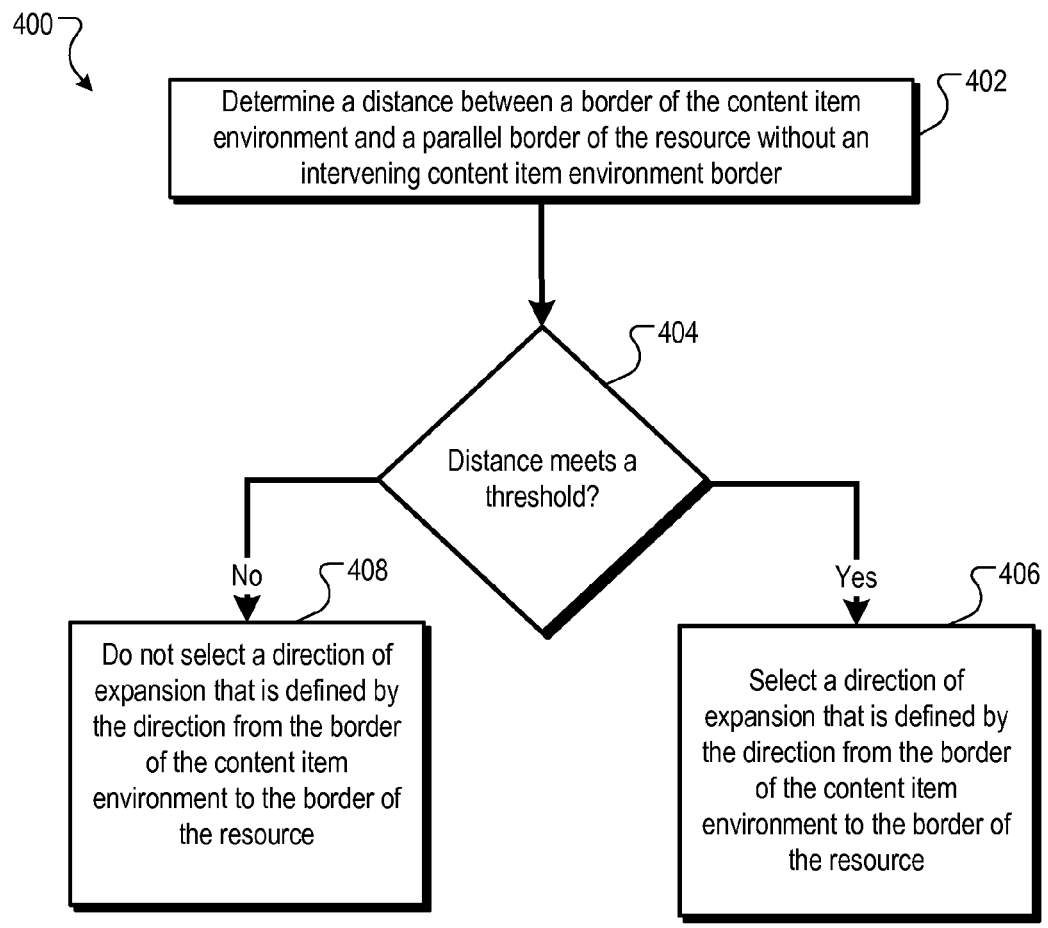
FIG. 4 is a flow diagram of an example process for calculating expansion directions for a content item environment.
Figure 5:
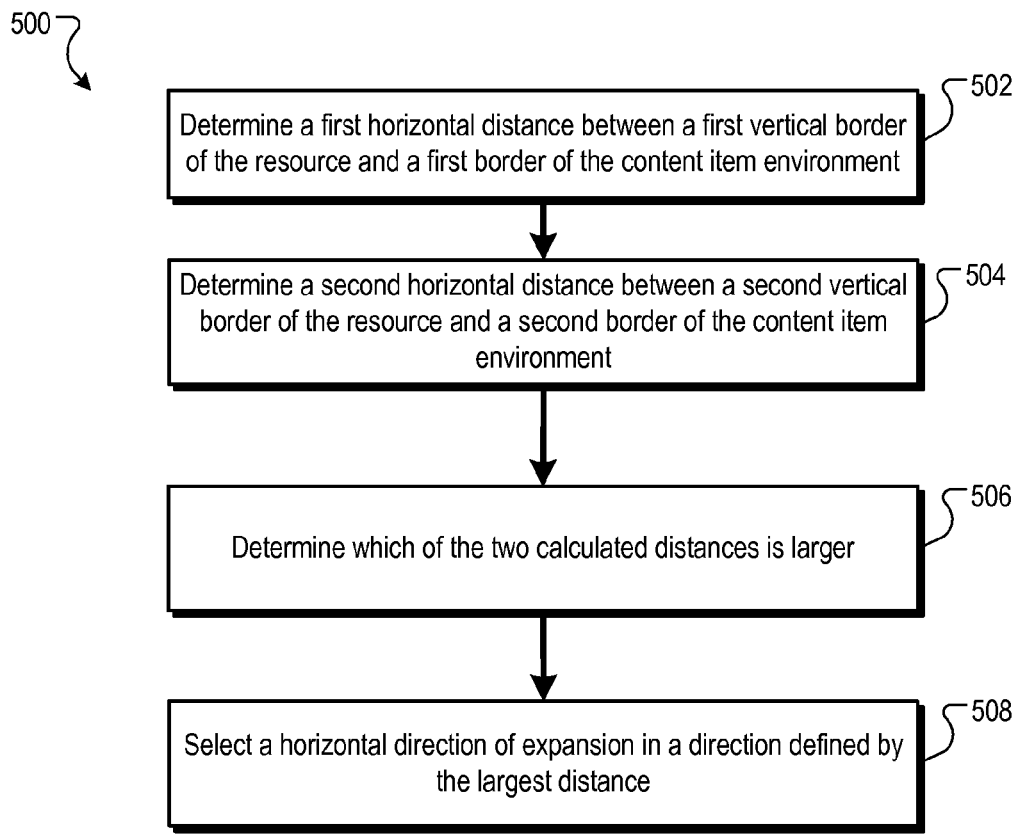
FIG. 5 is a flow diagram of another example process for calculating expansion directions for a content item environment.

If the process 300 determines that a successful prediction is not received, then the process 300 computes an expansion direction for the content item environment (310). The content management and delivery system 110, by means of the expansion calculation subsystem 130, will determine expansion directions from the position data received in the content item request. Example processes for determining expansion directions from these data have been described above, and are described in additional detail below, with reference to FIGS. 4 and 5.

The process 300 selects an expandable content item having the same expansion direction as the computed direction (312). The content item management and delivery system 110 will select the computed expansion directions and use them to filter content items for delivery in response to the request.

After a content item is selected, then process 300 provides response data that causes the selectable content item to be provided for the content item environment (314). For example, the selected content items, which include expandable content items that expand in either the computed expansion directions or the predicted directions, are submitted to an auction process (or some other selection process). One or more content items are then selected as being responsive to the request, and the content item management and delivery system 110 provides the content items to the requesting user device.

Expansion Direction Calculation

The expansion calculation subsystem 130 is responsible for calculating directions of expansion for content item environments. Operation of an example process 400 for calculating a horizontal expansion direction for a content item environment is described with reference to FIG. 4. The process 400 of FIG. 4 can identify multiple expansion directions along multiple axes.

The process 400 determines a distance between a border of the content item environment and a parallel border of the resource (or, alternatively, the viewport) without an intervening content item environment border (402). For example, with respect to FIG. 2A, the distances 203, 204, 206 and 207 are determined.

The process 400 determines if the distance meets a threshold distance (404). In some implementations, an eligible expansion direction for a particular determined if the distance in the direction from the content item environment border to the parallel border of the resource or viewport without an intervening content item environment border meets a threshold distance. In variations of these implementations, the expansion calculation subsystem 130 determines that there are multiple expansion directions of different lengths in each direction, based on multiple thresholds.

If the distance meets the threshold distance, the process 400 selects a direction of expansion that is defined by the direction from the border of the content item environment to the border of the resource (406). For example, with respect to FIG. 2A, the distances 203 and 206 meet at least one threshold, and thus the direction of "left", which is defined by the left border of the content item slot 205 and the left border of the resource, and "down", which is defined by the bottom border of the content item slot 205 and the bottom border of the resource, are selected.

If, on the other hand, the distance does not meet the threshold distance, then the process 400 does not select a direction of expansion that is defined by the direction from the border of the content item environment to the border of the resource (408). For example, the directions of "right" and "up" are not selected, because neither of the respective distances 204 and 207 meet a distance threshold.

In some implementations, a relative comparison of an expansion direction along a particular axis may be used to select an expansion direction. For example, the process 500 of FIG. 5 may select only one direction along a particular axis (i.e., along a horizontal or vertical axis).

The process 500 determines a first horizontal distance between a first vertical edge of a resource and a first edge of the content item environment within the resource (502). For example, the process 500 determines the distance 203.

The process 500 determines a second horizontal distance between a second vertical edge of a resource and a second edge of the content item environment within the resource (504). For example, the process 500 determines the distance 204.

After the first and second distances are determined, the process 500 determines which of the two calculated distances is larger (506). Because the distance 203 is larger than the distance 204, the distance 203 is determined to be the largest distance.

The process 500 selects a horizontal direction of expansion in a direction defined by the largest distance (508). For example, the direction of expansion defined by the distance 203 is "left," as the distance is defined by the distances between the left borders of the resource and the content item slot 205.

A similar process can be used to determine a vertical direction of expansion. In some implementations, the processes 400 and 500 can also be combined.

Additional Implementation Details

In some implementations, the content management and delivery system 110 can rely solely on the expansion calculation subsystem 130 for determining expansion directions. However, because the content item requests may be generated before the resource is fully rendered, expansion coverage may be reduced. For example, a request for a slot at the top of a resource may include position data that defines an artificially small resource dimension, as the resource has not fully rendered. Accordingly, the expansion calculation subsystem 130 may not select the "down" expansion direction when, in fact, the "down" direction is actually available. In some implementations, the request instructions include a timer that pauses the content item request from being generated until after the resource is fully rendered. The timer may be set by empirical data, e.g., based on an observation that on average resources take approximately X milliseconds to fully render. Thus, after X milliseconds, the timer expires, and the request is generated. The position data that are generated are then based on the dimensions as determined after the expiration of the timer, i.e., after at least X milliseconds. This results in accurate position data, which, in turn, leads to more accurate coverage.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving expandable content item requests for publishers, each request specifying a publisher, a content item environment position in a resource, and dimensions of the resource in which the content item environment is rendered;
   for each content item request, providing request data for a prediction specifying an expansion direction for the content item environment based on historical data of the publisher and the content item environment;
   for each prediction for which a successful prediction of a predicted expansion direction occurs, selecting an expandable content item having the same expansion direction as the predicted expansion direction;
   for each prediction for which a successful prediction does not occur:
      computing an expansion direction for the content item environment based on the location of the content item environment and dimension associated with the resource; and
      selecting an expandable content item having the same expansion direction as the computed expansion direction; and
   for each content item request, providing response data in response to the content item request that causes the selected expandable content item to be provided for the content item environment.

2. The method of claim 1, wherein the content item environment position in a resource and the dimensions and dimensions associated with the resource in which the content item environment is rendered comprise relative positions of borders of the content item environment and borders of the resource.

3. The method of claim 2, wherein computing an expansion direction for the content item environment comprises:
   determining a respective distance between each border of the content item environment and each parallel border of the resource without an intervening content item environment border;

for each respective distance that meets a threshold expansion distance, selecting a direction of expansion that is defined by the direction from the border of the content item environment to the border of the resource from which the respective distance was determined.

4. The method of claim 2, wherein computing an expansion direction for the content item environment comprises:
   determining a first distance, the first distance being a shortest horizontal distance from a first vertical border of the resource to a first border of the content item environment;
   determining a second distance, the second distance being a shortest horizontal distance from a second vertical border of resource to a second border of the content item environment;
   determine a largest of the first and second distances; and
   selecting a horizontal direction of expansion to be toward the border of the resource for which the largest distance of the first and second distances is determined.

5. The method of claim 4, wherein computing an expansion direction for the content item environment further comprises:
   determining a first distance, the first distance being a shortest vertical distance from a first horizontal border of the resource to a first border of the content item environment;
   determining a second distance, the second distance being a shortest vertical distance from a second horizontal border of resource to a second border of the content item environment;
   determine a largest of the first and second distances;
   selecting a vertical direction of expansion to be toward the border of the resource for which the largest distance of the first and second distances is determined.

6. The method of claim 5, wherein computing an expansion direction for the content item environment further comprises:
   selecting the expansion direction for the content item environment to be a combination of the horizontal direction of expansion and the vertical direction of expansion.

7. The method of claim 2, wherein computing an expansion direction for the content item environment comprises:
   determining a respective distance between each border of the content item environment and each parallel border of the resource without an intervening content item environment border;
   for each respective distance that meets a threshold expansion distance, selecting a direction of expansion that is defined by the direction from the border of the content item environment to the border of the resource from which the respective distance was determined.

8. The method of claim 1, wherein the content item environment position in a resource and dimensions associated with resource in which the content item environment is rendered comprise relative positions of borders of the content item environment and borders of the viewport in which the resource is displayed.

9. The method of claim 1, wherein the expandable content item is an expandable advertisement.

10. The method of claim 1, wherein the content item environment position in a resource and the dimensions and dimensions associated with the resource in which the content item environment is rendered comprise relative positions of borders of the content item environment and one of borders of the resource and borders of the viewport, wherein the borders of the viewport are used when the borders of the resource are unavailable.

11. A system, comprising:
   a data processing apparatus comprising one or more computers; and
   a non-transitory computer memory apparatus in data communication with the data processing apparatus and storing instructions executable by the data processing apparatus and that upon such execution cause the data processing apparatus to perform operations comprising:
   receiving expandable content item requests for publishers, each request specifying a publisher, a content item environment position in a resource, and dimensions of the resource in which the content item environment is rendered;
   for each content item request, providing request data for a prediction specifying an expansion direction for the content item environment based on historical data of the publisher and the content item environment;
   for each prediction for which a successful prediction of a predicted expansion direction occurs, selecting an expandable content item having the same expansion direction as the predicted expansion direction;
   for each prediction for which a successful prediction does not occur:
      computing an expansion direction for the content item environment based on the location of the content item environment and dimension associated with the resource; and
      selecting an expandable content item having the same expansion direction as the computed expansion direction; and
   for each content item request, providing response data in response to the content item request that causes the selected expandable content item to be provided for the content item environment.

12. The system of claim 11, wherein the content item environment position in a resource and the dimensions and dimensions associated with the resource in which the content item environment is rendered comprise relative positions of borders of the content item environment and borders of the resource.

13. The system of claim 12, wherein computing an expansion direction for the content item environment comprises:
   determining a respective distance between each border of the content item environment and each parallel border of the resource without an intervening content item environment border;
   for each respective distance that meets a threshold expansion distance, selecting a direction of expansion that is defined by the direction from the border of the content item environment to the border of the resource from which the respective distance was determined.

14. The system of claim 12, wherein computing an expansion direction for the content item environment comprises:
   determining a first distance, the first distance being a shortest horizontal distance from a first vertical border of the resource to a first border of the content item environment;
   determining a second distance, the second distance being a shortest horizontal distance from a second vertical border of resource to a second border of the content item environment;
   determine a largest of the first and second distances; and
   selecting a horizontal direction of expansion to be toward the border of the resource for which the largest distance of the first and second distances is determined.

15. The system of claim 14, wherein computing an expansion direction for the content item environment further comprises:

determining a first distance, the first distance being a shortest vertical distance from a first horizontal border of the resource to a first border of the content item environment;

determining a second distance, the second distance being a shortest vertical distance from a second horizontal border of resource to a second border of the content item environment;

determine a largest of the first and second distances;

selecting a vertical direction of expansion to be toward the border of the resource for which the largest distance of the first and second distances is determined.

16. The system of claim 15, wherein computing an expansion direction for the content item environment further comprises:

selecting the expansion direction for the content item environment to be a combination of the horizontal direction of expansion and the vertical direction of expansion.

17. The system of claim 12, wherein computing an expansion direction for the content item environment comprises:

determining a respective distance between each border of the content item environment and each parallel border of the resource without an intervening content item environment border;

for each respective distance that meets a threshold expansion distance, selecting a direction of expansion that is defined by the direction from the border of the content item environment to the border of the resource from which the respective distance was determined.

18. The system of claim 11, wherein the content item environment position in a resource and dimensions associated with resource in which the content item environment is rendered comprise relative positions of borders of the content item environment and borders of the viewport in which the resource is displayed.

19. The system of claim 11, wherein the expandable content item is an expandable advertisement.

20. A computer memory apparatus storing instructions executable by a data processing apparatus and that upon such execution cause the data processing apparatus to perform operations comprising:

receiving expandable content item requests for publishers, each request specifying a publisher, a content item environment position in a resource, and dimensions of the resource in which the content item environment is rendered;

for each content item request, providing request data for a prediction specifying an expansion direction for the content item environment based on historical data of the publisher and the content item environment;

for each prediction for which a successful prediction of a predicted expansion direction occurs, selecting an expandable content item having the same expansion direction as the predicted expansion direction;

for each prediction for which a successful prediction does not occur:

computing an expansion direction for the content item environment based on the location of the content item environment and dimension associated with the resource; and selecting an expandable content item having the same expansion direction as the computed expansion direction; and for each content item request, providing response data in response to the content item request that causes the selected expandable content item to be provided for the content item environment.

* * * * *